United States Patent [19]

Kukura

[11] Patent Number: 4,656,935
[45] Date of Patent: Apr. 14, 1987

[54] APPARATUS FOR MAKING AN OVULAR SHAPED EDIBLE BUN

[76] Inventor: Raymond R. Kukura, 2608 E. Newton Pl., Tulsa, Okla. 74110

[21] Appl. No.: 747,360

[22] Filed: Jun. 21, 1985

[51] Int. Cl.⁴ .............................................. A47J 37/01
[52] U.S. Cl. ......................................... 99/426; 99/428; 99/439; 426/138; 249/122
[58] Field of Search ................. 99/383, 382, 428, 439; 426/138; 249/122

[56] References Cited

U.S. PATENT DOCUMENTS

| | | | |
|---|---|---|---|
| 1,476,910 | 12/1923 | Naugle | 99/428 X |
| 1,974,204 | 9/1934 | Cooter | 99/439 X |
| 2,018,950 | 10/1935 | Couture | 99/428 X |
| 2,156,145 | 4/1939 | Cavett | 99/439 |
| 3,296,956 | 1/1967 | Turner | 99/439 |
| 3,385,205 | 5/1968 | McCloud | 99/439 |
| 3,831,507 | 8/1974 | Wheaton | 99/383 X |
| 3,943,840 | 3/1976 | Bolte | 99/383 X |
| 4,009,859 | 3/1977 | Bangert | 249/122 |
| 4,047,477 | 9/1977 | Berke | 99/383 X |
| 4,214,517 | 7/1980 | Caldwell | 99/383 X |
| 4,348,949 | 9/1982 | Selleck | 99/428 X |

Primary Examiner—Billy J. Wilhite
Attorney, Agent, or Firm—Head, Johnson & Stevenson

[57] ABSTRACT

Apparatus, product and method for making an ovular shaped edible bun. The bun having flat bottom and top with an inner chamber to receive other edible food products.

9 Claims, 9 Drawing Figures

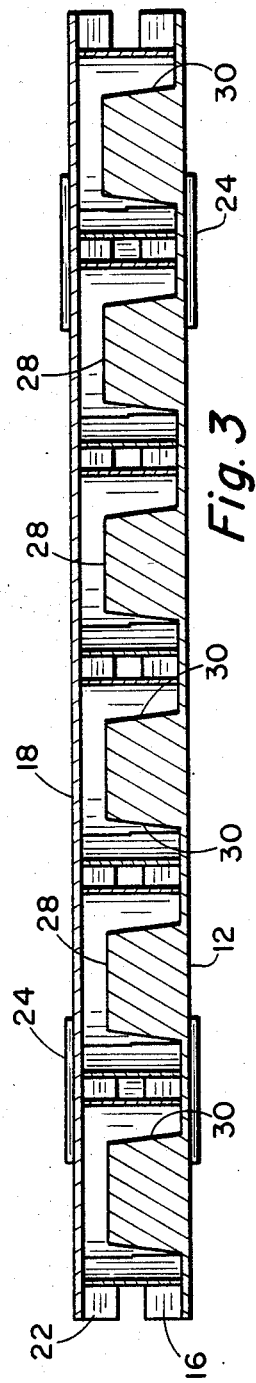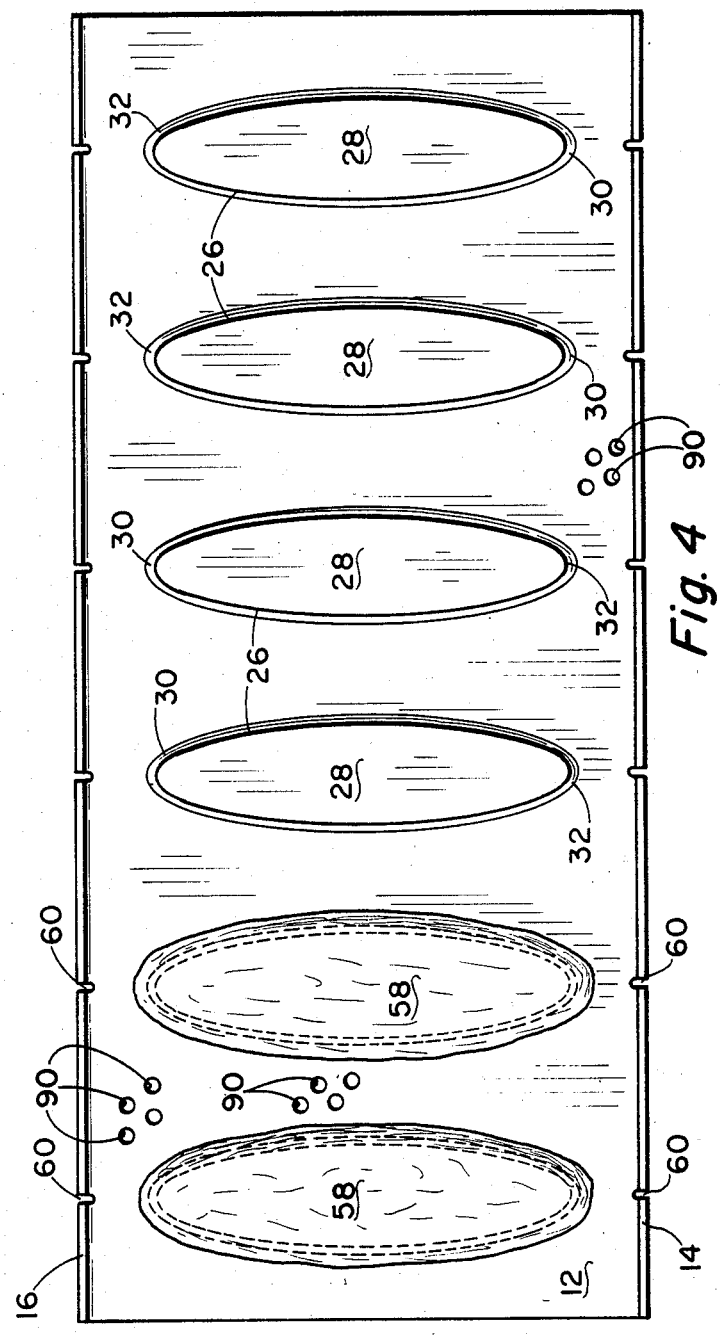

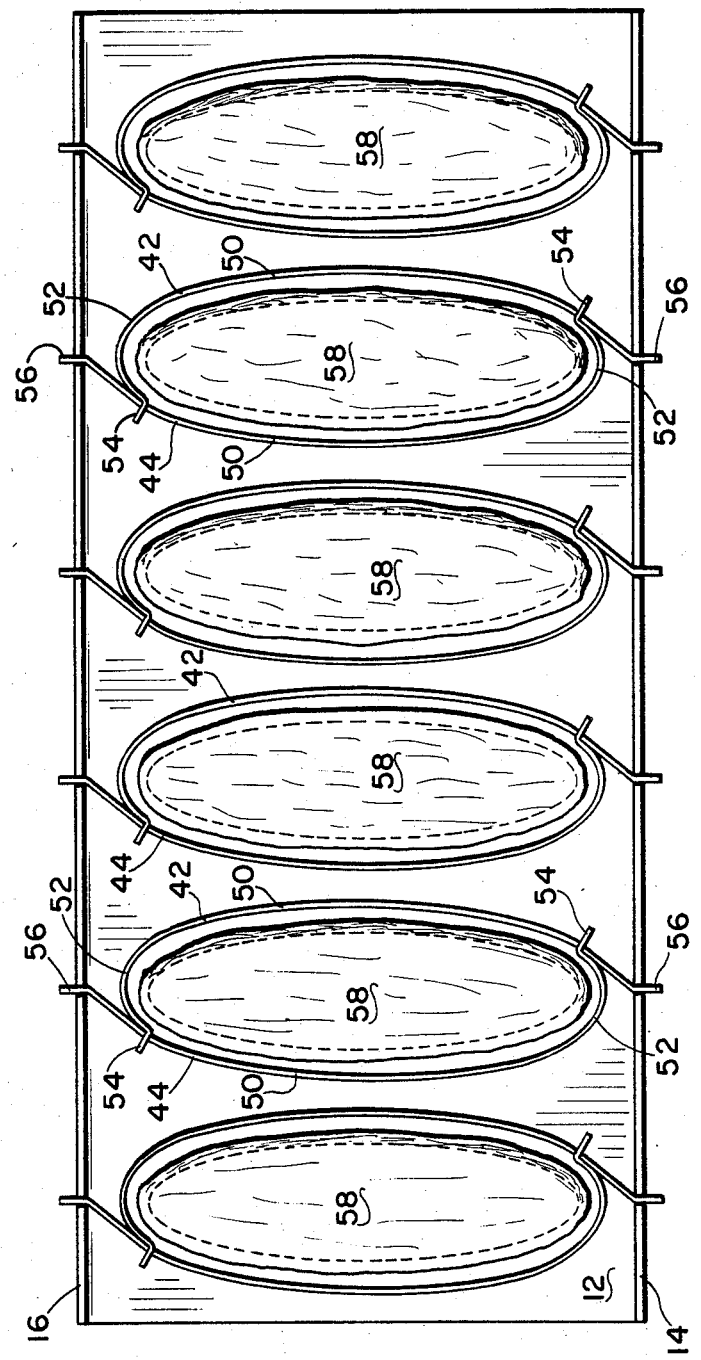

APPARATUS FOR MAKING AN OVULAR SHAPED EDIBLE BUN

BACKGROUND OF THE INVENTION

The field of this invention is directed to improvements in edible buns and especially buns that have a deep central recess therein and molds to make same.

Representative of the prior art are the following U.S. patents:

U.S. Pat. No. 1,974,204, Cooter
U.S. Pat. No. 2,029,664, L. L. Lassiter
U.S. Pat. No. 2,156,145, E. O. Cavett et al
U.S. Pat. No. 2,492,832, A. B. Barasch
U.S. Pat. No. 2,508,724, F. W. Moffett, Jr.
U.S. Pat. No. 3,924,009, Goldberg et al
U.S. Pat. No. 3,943,840, Bolte
U.S. Pat. No. 3,950,563, Wheaton
U.S. Pat. No. 4,065,581, Heiderpriem
U.S. Pat. No. 4,205,091, Van Horne
U.S. Pat. No. 4,214,517, Caldwell
U.S. Pat. No. Des. 101,549, C. W. Morton
U.S. Pat. No. Des. 19,696, W. Beckstein
U.S. Pat. No. Des. 119,054, B. B. Tolmack
U.S. Pat. No. Des. 205,126, Haessler
U.S. Pat. No. Des. 251,276, Majeski
U.S. Pat. No. Des. 251,816, Majeski In addition to the art described above the use of bread articles as edible containers for other types of food is well known. A particular example, of course, is the hotdog bun in which a weiner or sausage and various condiments are disposed.

A problem occurs with many of the prior art devices such as Heiderpriem U.S. Pat. No. 4,065,581 in maintaining uniformity of the shape of the bun.

SUMMARY OF THE INVENTION

This invention is directed to an ovular boat shaped edible bun and more particularly to an apparatus for making same both uniform in shape and in substantial mass quantities.

It is a further object of the invention to provide an apparatus for making an ovular boat shaped edible bun that can be easily assembled and disassembled for cleaning and reuse.

The bun provided by the present invention has an outer shape beginning with a flat ovoid bottom with rounded ends. The ovoid shape being essentially thin and long. The outer sides of the bun extend upwardly therefrom substantially vertically or in any event slightly upwardly and outwardly to a substantially flat top surface. The inner shape or recess is smaller than, but substantially parallel to the outer shape. In one embodiment the inner recess comprises a flat inner ovoid bottom parallel to the outer bottom with the vertical inner sidewalls extending slightly upward and outward conjoining with the upwardly and outward inner ends.

Another specific object of the invention is to provide a apparatus for making the ovular shaped bun of this invention. This occurs by an assembly of a base having upward front and back lip or sides. A top plate has downward front and back sides substantially matching the base when assembled together. A plurality of spaced parallel male mold inserts are attached and depend from the inner side of one of the top plate and base, usually the base. The form of the mold is configured to create the desired internal shape of the bun as heretofore and herein described. A plurality of dough keepers surround each of the inserts when they are assembled between the base and top plate, which keepers retain the outer sides of the bun during the formative baking process. Each keeper, in a specific form of the invention is comprised of two interlocking and separable halves having outward tab means. The tab means interlock with the assembled top and base. The keepers, when assembled with the base and top plate, are of a depth that will define the top and bottom of the bun and in any event, is greater than the depth of the male mold inserts. A means is provided to releasably retain the assembly together.

A further object of the invention, is to provide a process for making the bun of this invention by pre-preparing a dough of approximately ⅛ inch thick and cut to a special shape wherein the ends are, for a short length, of a straight sided V-shape, conjoining at the sides with a rounded or ovular shape. Each of the precut dough members are placed over the male mold inserts where they are allowed or caused to lap or fold thereover. Either previous to the placement of the pre-prepared dough or thereafter the dough keepers are positioned to surround each of the male mold inserts to create and retain the outer sides of the bun. The top plate and base are then assembled together and retained and placed in an oven where the dough is allowed to rise to the shape of the mold.

BRIEF DESCRIPTION OF THE DRAWINGS

FIG. 3 is a sectional view taken along the line 3—3 of FIG. 1.

FIG. 4 is a top plan view of the base of the invention.

FIG. 5 is a top plan view of the base of the invention including preassembled dough keepers surrounding each of the male mold inserts.

DESCRIPTION OF THE PREFERRED EMBODIMENT

Before explaining the present invention, in detail, it is to be understood that the invention is not limited in its application to the details of construction and arrangement of parts illustrated in the accompanied drawings, since the invention is capable of other embodiments and being practiced or carried out in a variety of ways. Also, it is to be understood that the phraseology or terminology employed herein is for the purpose for description and not of limitation.

Figure 1:
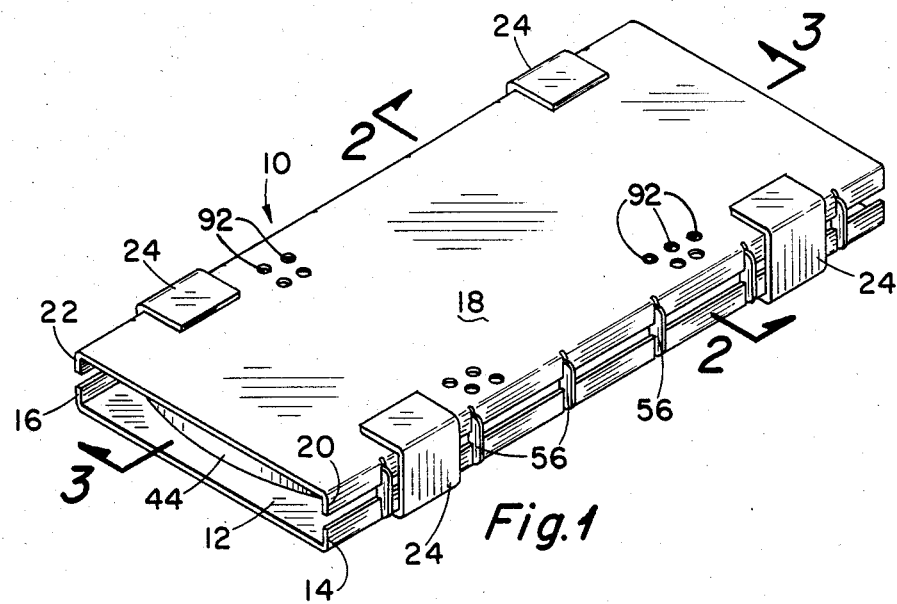
FIG. 1 is an overall perspective view of the assembled apparatus for making the bun of this invention.
Figure 2:
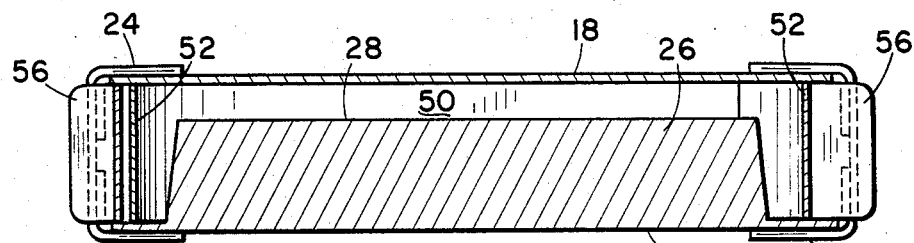
FIG. 2 is a sectional view taken along the line 2—2 of FIG. 1.
Figure 6:
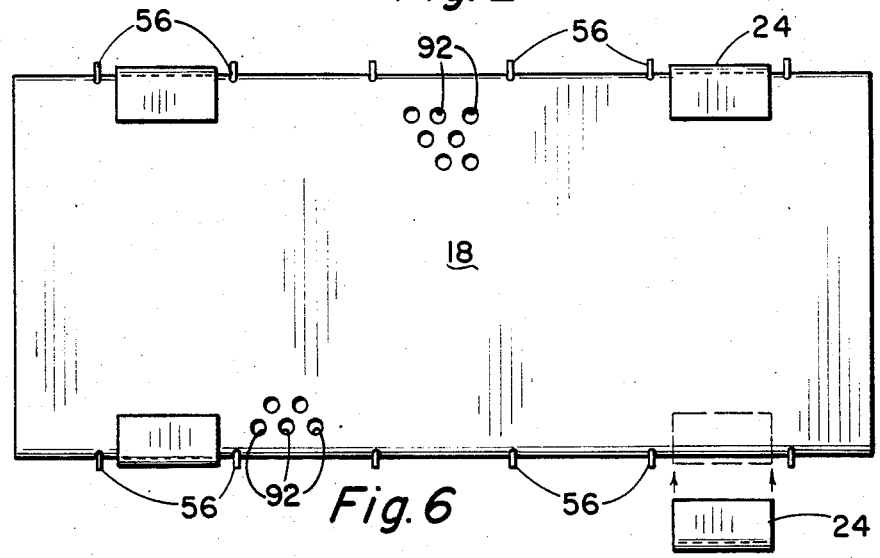
FIG. 6 is a top plan view of the assembly of FIG. 1.

Referring now to FIG. 1 the apparatus for shaping and baking the edible bun of this invention comprises an assembled mold 10 of a base 12 having upwardly extending front side 14 and back side 16. A top plate 18 includes downward front and back sides 20 and 22, matching with 14 and 16 of base 12 respectively. The assembly, in this embodiment is held together by a plurality of clips 24. The base 12 includes a plurality of spaced and parallel male mold inserts 26 either attached to, or removably attached thereto. The form of the mold is best seen in FIG. 4 is of a shape to create the internal shape of the bun. The mold insert 26 comprises a flat ovoid bottom 28 but substantially vertical sidewalls 30. Preferrably the sidewalls taper from the bottom 28, in this view, downwardly and outwardly where it joins with base 12 and which conjoins with rounded ends 32.

Figure 7:
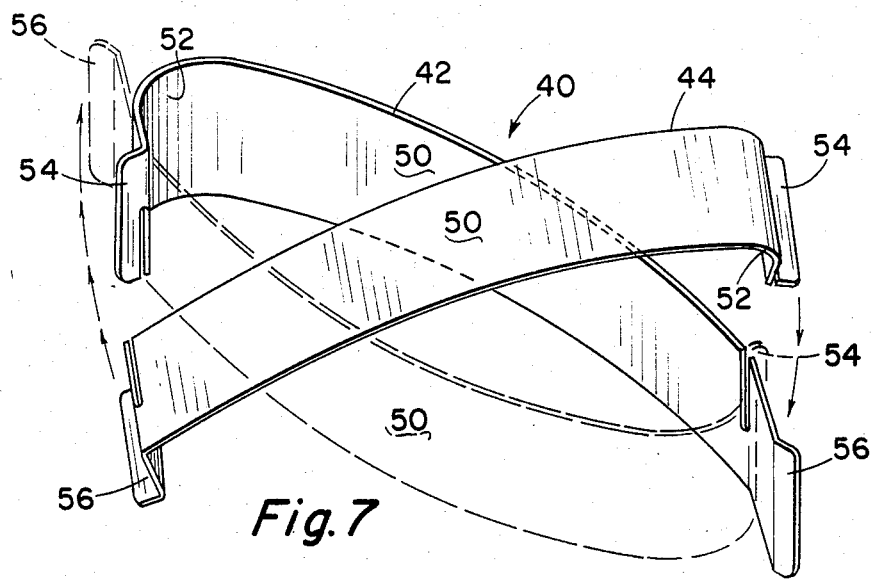
FIG. 7 is a perspective view describing the shape and operation of a dough keeper utilized in this invention.

Referring now to FIGS. 1-3, 5 and 7 the dough keepers 40 of the invention are described individually and in the assembled condition. As shown in FIGS. 5 and 7 the preferred form of dough keeper comprises identical halves 42 and 44. Each keeper is substantially parallel to and larger than the male mold inserts 28. Each half comprises a rounded ovular portion 50 being curved at the end 52 to an interlocking tab 54. The other end of this half keeper includes a retaining tab 56. The retaining tabs 56 are adapted to be interlocked within a grooves 60 formed in the sides 14 and, 16, 20 and 22 of the respective base and top plate. The grooves are best shown in FIG. 4 while the interlocking arrangement is best shown in FIG. 5.

Figure 8:
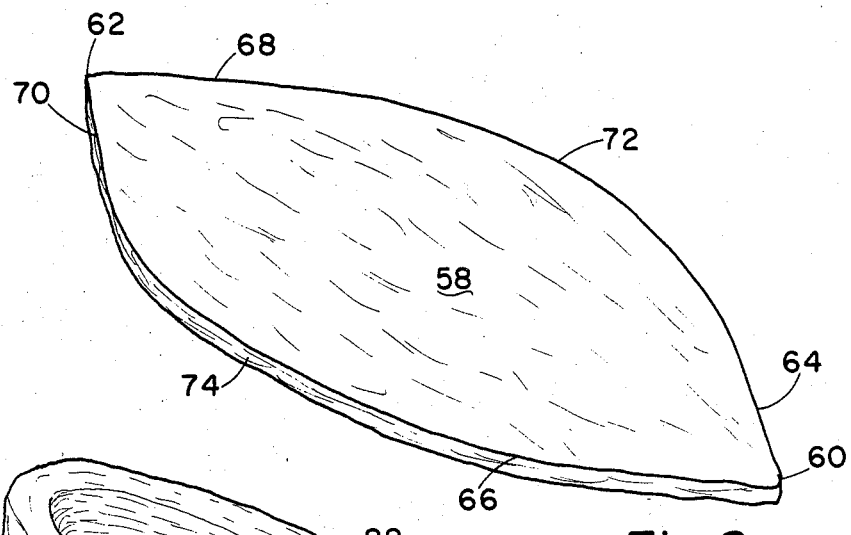
FIG. 8 is a perspective view of a typical piece of dough used in the invention.
Figure 9:
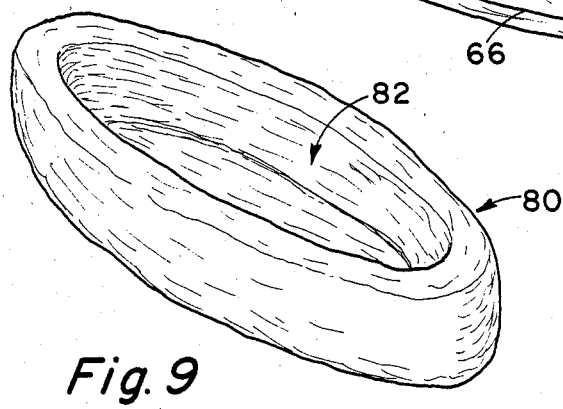
FIG. 9 is a perspective view of one form of bun capable of being created by this invention.

FIG. 8 is descriptive of the shape of the dough piece 58 used in making the bun of this invention. In the preferred embodiment the dough is formed of a substantially ¼" thick piece which has been cut having V-shaped ends 60 and 62 with respective straight sides 64 and 66, and 68 and 70. Connecting the straight sides 64 and 68 and 66 with 70 are respective ovular or rounded sides 72 and 74. It has been found that the V-shaped ends concentrate extra dough to fill in the ends as the bun is formed when it rises.

Pieces of dough 58 such as shown in FIG. 8 are lain upon the male mold inserts as shown in FIGS. 4 and 5. The operator can fold the dough or it will fall around the mold insert. Thereafter the preassembled dough keepers are attached by inserting retaining tabs 56 into grooves 60. Top 18 is then attached and held together as with clips 24 and placed in the oven for proper cooling time.

The resultant edible bun of this invention is generally indicated by the numeral 80, as having a recess generally indicated by the numeral 82, therein to receive other edible foods as for example, hot solid foods, frankfurters, sausage or other meat items and accompanying condiments. The shape of the boat is especially adaptable to receive other edible materials such as, cold delicatessen style salads, slaws, etc., and desserts, ice cream and pie filling.

The bun is believed to be a novel open sandwich which can be made of bread dough, bisquit dough or puffed pastry.

One embodiment includes a plurality of holes 90 in base 12 and/or holes 92 in the top plate 18.

Because the bun is flat on the bottom it is easy to handle and can be set down as on a table without spilling the contents.

I claim:

1. Apparatus for making an ovular boat shaped edible bun comprising an assembly of:
   a base with upward front and back sides;
   a top plate with downward front and back sides substantially matching said base when assembled therewith;
   a plurality of parallel spaced male mold inserts attached and depending from the inner side of one of said top plate and base the form of said mold configured to create the internal shape of said bun to have a flat ovoid bottom, substantially vertical sides slightly upwardly and outwardly conjoining with rounded upwardly and outward ends;
   a plurality of dough keepers surrounding each insert when assembled with said base and top plate to create and retain the outer sides of said bun, each keeper comprised of two identical, interlocking and separable halves, and having outward tab means, said keepers, when assembled with said base and top plate, are of depth defining the top and bottom of said bun, being greater than the depth of said male mold inserts;
   a plurality of parallel spaced and matching grooves in the upward sides and downward sides of said respective base and top plate, said grooves to receive said tab means of each of said keepers; and
   means to releasably retain said assembly together.

2. Apparatus for making an ovular shaped edible bun comprising an assembly of:
   a base;
   a top plate;
   a plurality of parallel spaced male mold inserts attached to one of said base and top plate and therebetween, the form of said mold configured to create the internal shape of said bun to have a flat ovoid bottom, sides tapering slightly upwardly and outwardly conjoining with rounded ends that go upwardly and outward;
   a plurality of dough keepers, each surrounding each said insert when assembled with said base and top plate, each keeper having means cooperative with means on said base and top plate to retain said keepers when assembled; and
   means to releasably retain said assembly together.

3. Apparatus of claim 2 wherein cooperative means comprises said base and top plate include matching upwardly and downwardly front and back sides with means to releasably secure said keepers therewith.

4. Apparatus of claim 2 wherein said means to releasably retain said assembly together comprises a plurality of clips outward of said base and top plate.

5. Apparatus of claim 2 wherein each of said keepers comprise two identical interlocking and separable halves.

6. Apparatus of claim 5 wherein each half of each said keeper interlock with the other half along the sides.

7. Apparatus of claim 6 wherein each half of each keeper includes an outward tab for interlocking with said means on said base and top plate to retain said interlocked halves in its position surrounding each insert.

8. Apparatus of claim 2 wherein said keepers are of shape to create the outer shape of said bun to have tapered sides and ends of said extending upwardly and outwardly from the bottom.

9. Apparatus of claim 2 wherein said keepers are of shape to create the outer shape of said bun to have substantially vertical sides and ends from the bottom.

* * * * *